(12) United States Patent
Akkerman et al.

(10) Patent No.: US 11,749,251 B2
(45) Date of Patent: Sep. 5, 2023

(54) CONTROL OF A PIEZOELECTRIC TRANSDUCER ARRAY

(71) Applicant: Nederlandse Organisatie voor toegepast-natuurwetenschappelijk onderzoek TNO, 's-Gravenhage (NL)

(72) Inventors: Hylke Broer Akkerman, Rosmalen (NL); Paul Louis Maria Joseph Van Neer, Bergschenhoek (NL); Arno Willem Frederik Volker, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 77 days.

(21) Appl. No.: 17/619,938

(22) PCT Filed: Jun. 22, 2020

(86) PCT No.: PCT/NL2020/050403
§ 371 (c)(1),
(2) Date: Dec. 16, 2021

(87) PCT Pub. No.: WO2020/263082
PCT Pub. Date: Dec. 30, 2020

(65) Prior Publication Data
US 2022/0301541 A1 Sep. 22, 2022

(30) Foreign Application Priority Data

Jun. 24, 2019 (EP) .................................... 19182089

(51) Int. Cl.
*H04R 17/00* (2006.01)
*G10K 11/34* (2006.01)
(Continued)

(52) U.S. Cl.
CPC ............ *G10K 11/346* (2013.01); *G06F 3/016* (2013.01); *H04R 1/403* (2013.01); *H04R 3/12* (2013.01); *H04R 17/00* (2013.01)

(58) Field of Classification Search
CPC .......... H04R 1/403; H04R 3/12; H04R 17/00; G10K 11/346
(Continued)

(56) References Cited

U.S. PATENT DOCUMENTS 5,027,820 A * 7/1991 Pesque ................ G01S 15/8929
600/443
6,775,388 B1 8/2004 Pompei
(Continued)

FOREIGN PATENT DOCUMENTS

WO WO 2016/054448 A1 4/2016

OTHER PUBLICATIONS

European Patent Office, International Search Report in corresponding International Application No. PCT/NL2020/050403, dated Oct. 7, 2020 (3 pages).

*Primary Examiner* — Disler Paul
(74) *Attorney, Agent, or Firm* — Leydig, Voit & Mayer, Ltd.

(57) ABSTRACT

A method and system for controlling an array of piezoelectric transducers (11, 12, 13). Respective driving signals (Vn) are applied to the transducers. The driving signals (Vn) comprise an alternating component (A) oscillating at one or more driving frequencies to cause corresponding vibrations in the transducers for generating acoustic waves (Wn). One or more of the driving signals (Vn) are offset by a respective bias voltage (Bn). The bias voltage (Bn) is controlled to reduce a difference in resonance frequencies between the transducers. To eliminate any remaining difference, the alternating component (A) to at least a subset of the trans-
(Continued)

ducers (11,12) is periodically reset. In this way the phases of the resulting acoustic waves (W1,W2) can be synchronized.

15 Claims, 5 Drawing Sheets

(51) Int. Cl.
*G06F 3/01* (2006.01)
*H04R 1/40* (2006.01)
*H04R 3/12* (2006.01)

(58) Field of Classification Search
USPC .............................................. 381/77, 89, 97
See application file for complete search history.

(56) References Cited

U.S. PATENT DOCUMENTS

| | | | |
|---|---|---|---|
| 7,542,579 B2* | 6/2009 | Sekino | G10K 11/28 |
| | | | 381/163 |
| 7,668,323 B2* | 2/2010 | Miyazaki | H04R 19/02 |
| | | | 381/354 |
| 8,854,923 B1* | 10/2014 | Eyster | H04R 17/10 |
| | | | 310/317 |
| 9,454,954 B2* | 9/2016 | Hajati | G10K 11/343 |
| 9,647,195 B2* | 5/2017 | Hajati | G01S 15/8915 |
| 2005/0089176 A1* | 4/2005 | Norris | H04R 17/00 |
| | | | 381/79 |
| 2012/0245408 A1 | 9/2012 | Shen et al. | |
| 2015/0358740 A1 | 12/2015 | Tsai et al. | |

\* cited by examiner

CONTROL OF A PIEZOELECTRIC TRANSDUCER ARRAY

CROSS-REFERENCE TO RELATED APPLICATIONS

This patent application is a U.S. National Phase of PCT International Application No. PCT/NL2020/050403, filed Jun. 22, 2020, which claims priority to European Application No. 19182089.3, filed Jun. 24, 2019, which are both expressly incorporated by reference in their entireties, including any references contained therein.

TECHNICAL FIELD AND BACKGROUND

The present disclosure relates to piezoelectric transducers, in particular methods and systems for controlling a transducer array.

Acoustic devices can be used for various applications, such as acoustic) imaging, measurement, audio, actuation, haptic feedback, et cetera. When placed in an array, multiple acoustic transducers can be configured to work in unison for generating a combined acoustic wave profile. For example, the phases of individual waves can be configured to constructively interfere at some point in midair for applications such as haptic feedback/control, or (3D) audio. Acoustic transducers typically comprise a vibrating membrane to generate respective acoustic waves. For example, vibrations can be induced in the membrane by applying an alternating electric driving signal (AC voltage) to a piezoelectric material. However, due to manufacturing tolerances, stresses in the membrane, deformation, prolonged use, and/or temperature variations over the array, differences in the characteristic of the transducers may occur that can reduce overall efficiency of the device. For example, when phase differences between the acoustic waves are not well controlled the interference pattern may be affected and an efficiency of the device can suffer.

There remains a desire to further improve operation and efficiency of acoustic transducer arrays.

SUMMARY

According to some aspects, the present disclosure relates to a method for controlling an array of piezoelectric transducers. The method comprises applying respective (electric) driving signals to the transducers, e.g. piezoelectric material part of the transducers. Typically, the driving signals comprise an alternating component (AC voltage) oscillating at one or more driving frequencies to cause corresponding vibrations in the transducers. The vibrating transducers, e.g. membranes, can be used to generate acoustic waves, e.g. in air or some other medium. In some preferred embodiments, as described herein, one or more of the driving signals are offset by a respective bias voltage. For example, a magnitude of the bias voltage is controlled to reduce a difference in (the effective) resonance frequencies between the transducers, e.g. as compared to the (intrinsic) resonance frequencies without the bias voltage.

The inventors find that in an acoustic array, one or more transducers may have an undesired deviation of characteristics such as resonance frequency compared to other transducers. For example, there can be slight variations in diameter, thickness, or material between the transducers as a result of manufacturing. The variation can also develop after manufacturing, e.g. by stresses during use and/or temperature. Without being bound by theory, the inventors find that such variations may negatively affect a (combined) function or efficiency of the transducer array. In particular, a variation in the resonance frequencies may affect a relative phase between the resulting acoustic waves of different transducers. For example, a phase delay of the oscillating transducer relative to the driving signal force may depend on the resonance frequency. The variation in phase delay may be most noticeable when a driving frequency is close to the (variable) resonance frequency, as desired. Alternatively, or in addition, to a variable phase shift between the driving signal and resulting oscillation, a dominant frequency of the acoustic waves may be affected by the resonance frequency. Accordingly, the acoustic waves may be generated with an undesired variation in frequency which can build up to relative phase differences and (periodic) lowering of the constructive interference. When instantaneous or time-dependent variation of the phases occurs, a combined wave intensity relying on the constructive interference of different waves, can be lowered. Thus an efficiency of the acoustic device may be reduced. As will be appreciated, the present methods and systems may alleviate these or other problems by reducing a spread of the respective resonance frequencies using controlled bias voltages to the piezoelectric transducers. Any remaining differences in resonance frequencies can be further suppressed by periodically resetting the alternating component to at least a subset of the transducers. By the combination of features the phases of the resulting acoustic waves can thus remain optimally synchronized.

Other or further aspects can relate to corresponding systems and devices comprising acoustic transducers. For example, the system comprises a controller with circuitry and/or programming to perform operational acts in accordance with the present methods.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

Preferred embodiments comprise adding a DC voltage to a respective drive signal to tune the resonance frequency of a membrane, e.g. compensating any differences between neighboring membranes in an array. In some embodiments, the frequency difference may not be tuned down to zero. For example, there can be a limit to the accuracy in determining the frequencies, e.g. leading to measurement errors. It may also occur that the variation between the resonance frequencies of the membranes is too large to be compensated by use of a DC voltage. For example, the DC voltage can be limited by the breakthrough voltage through the piezo-material, or break through voltage of the materials separating the electrical lines (could be air). Also the maximum allowable DC voltage could be limited by heating effects or power use.

In some embodiments, the polarity of the drive voltage can be reset or reversed to re-synchronize the membrane vibration, e.g. based on an error estimate. Some embodiments may comprise a measurement step where one or group of membranes is used in receive mode. From this the resonant frequency can established. The relation between dc-voltage and frequency shift can be determined e.g. from modelling or experimentally. Alternatively this can be done adaptively, e.g. wherein dc-voltage and receive voltage are decoupled with a capacitor. An error estimate can be made of the remaining error in resonance frequency. In some embodiments, this may determine a the time after which the drive voltage polarity is reversed instantaneously.

Alternatively, or additionally, it can be envisaged to use a few (could be separate) elements/membranes to monitor the standing wave pattern caused by guided waves in the backplane (the flexible sheet containing the membranes). These guided waves can e.g. be induced due to a large opening angle of the membrane transducers. The amplitude of the standing wave pattern is expected to be highest when all elements are vibrating in phase. Based on the measured amplitude of the standing wave pattern one could adjust the DC voltage of groups of elements in a random/semi-random/non-random pattern and monitor time needed to reverse the drive voltage polarity. In this manner the differences in resonance frequencies due to manufacturing differences could be identified over time.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
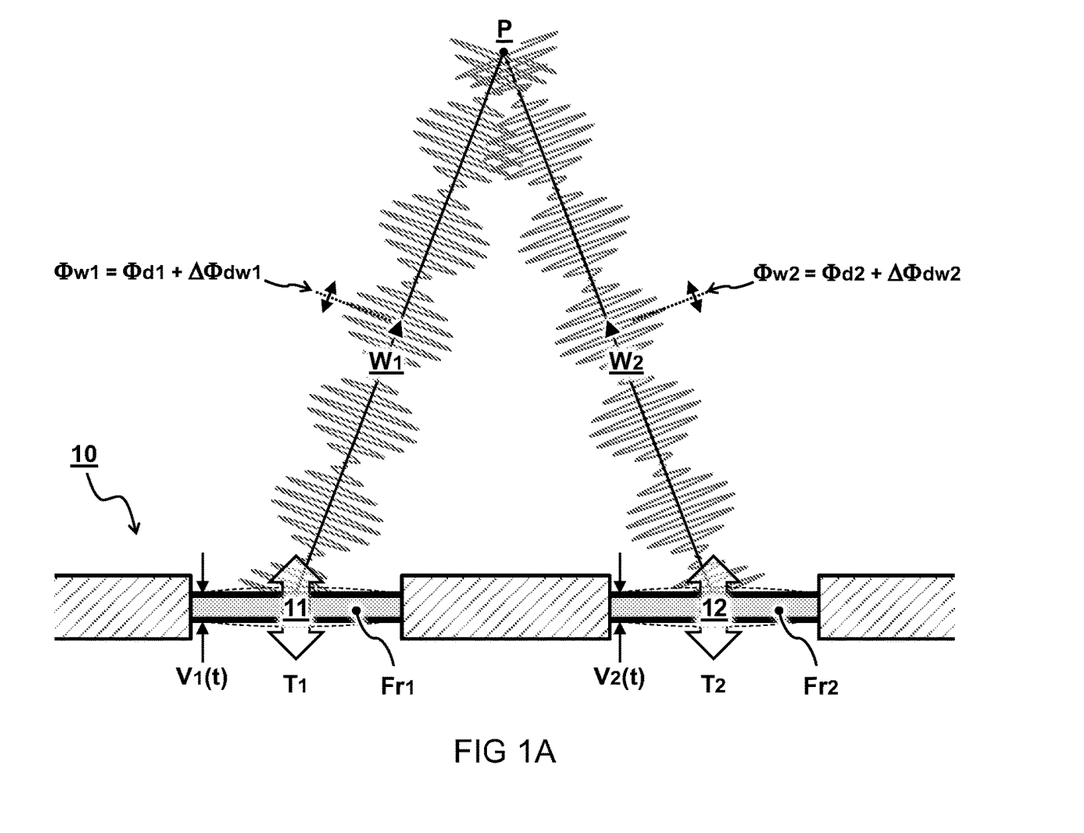
FIG. 1A illustrates a cross-section view of transducers generating respective acoustic waves.
Figure 1B:
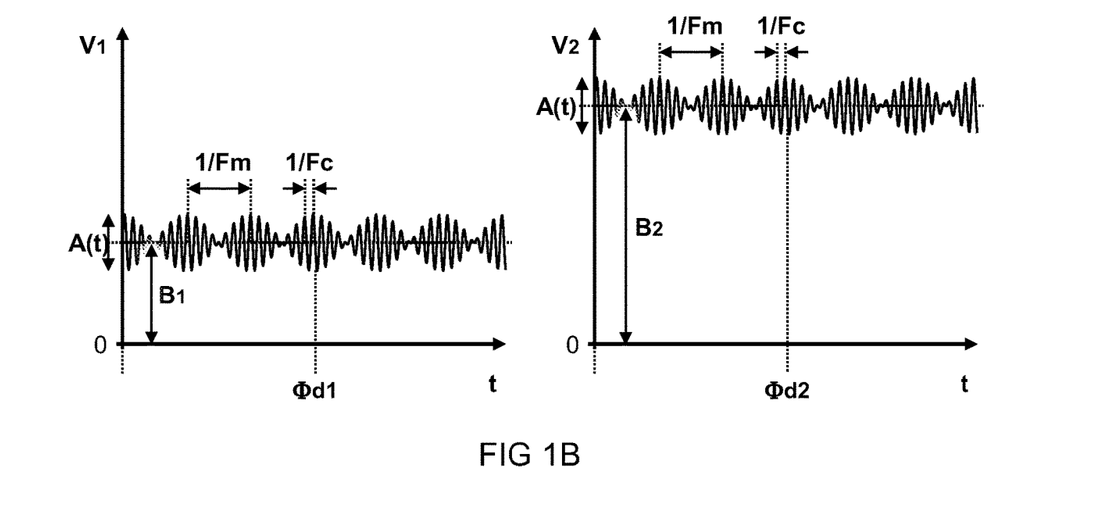
FIG. 1B illustrates respective driving signals.

FIG. 1A illustrates a cross-section view of transducers 11,12 generating respective acoustic waves W1, W2. While acoustic waves, e.g. in air, generally propagate as longitudinal waves which oscillate in the direction of propagation, the oscillation is shown here in a direction transverse to the wave propagation for illustrative purposes. Also other media than gasses (such as air) can be used to propagate acoustic waves. For example, viscous liquids and solids can also support shear waves, where the particle vibration is perpendicular to the propagation direction. Similar applications as described herein can also be used for such media. FIG. 1B illustrates respective driving signals V1, V2, e.g. corresponding to the acoustic waves in the previous figure.

According to some aspects, the present disclosure relates to a method for controlling an array of piezoelectric transducers 11,12. Typically, an array of transducers (11,12) is controlled by applying respective driving signals V1, V2 to the transducers 11,12. For example, the driving signals V1, V2 comprise an alternating component "A" oscillating at one or more driving frequencies (here Fc and Fm) to cause corresponding vibrations T1, T2 in the transducers 11,12 for generating the acoustic waves W1, W2. In a preferred embodiment, one or more of the driving signals V1,V2 are offset by a respective bias voltage B1, B2. For example, the bias voltage B1, B2 is controlled to reduce any differences in resonance frequencies Fr1, Fr2 between the transducers 11,12.

In some embodiments, the transducers 11,12 are arranged in a planar array. For example, the transducers 11,12 are disposed on or in a (planar) substrate 10. Alternatively, also curved substrates and arrangements can be envisaged (not shown). The substrate 10 can also be flexible, e.g. to adapt its shape to that of another surface. In a preferred embodiment, each of the transducers 11,12 comprises a (flexible) membrane, e.g. attached to the surrounding substrate. For example, the membrane can be actuated to cause respective vibrations T1,T2 in the membranes which generate the acoustic waves W1,W2. Most preferably, a piezoelectric transducer is used to actuate the membranes. In a preferred embodiment, piezoelectric material is disposed as a layer on the flexible membrane. Also other layers can be provided, e.g. electrode layers used to apply the respective driving signals V1,V2 to the piezoelectric layer.

By driving the transducers with a carrier frequency Fc at or around a respective resonance frequency Fr1,Fr2 of the transducers 11,12, performance may be improved. For example, a first or ground resonance of the membrane is used. The resonance frequency of the transducers may be relatively high, e.g. more than one kiloHertz, more than ten kiloHertz, more than 100 kiloHertz or even more than one MegaHertz. Such high frequencies may not be suitable for all applications. For example, frequencies above eight hundred hertz may be difficult to feel for haptic applications. For example, an optimal frequency for haptic feedback may be between fifty and five hundred hertz, preferably between hundred and three hundred hertz.

In some embodiments, the driving signals V1,V2 comprise multiple frequencies including a carrier frequency Fc (as best as possible) corresponding to the resonance frequencies Fr1,Fr2 of the transducers; and an envelope or modulation frequency Fm depending on the application. For example, a haptic feedback device may use a carrier frequency at 40 kHz which is amplitude modulated by a modulation frequency at 200 Hz. It can also be envisaged to use more than two frequencies, or even a bandwidth of frequencies, e.g. including resonance frequencies of the respective transducers.

In some embodiments, the driving signals comprise a carrier frequency above ten kHz, e.g. tens or hundreds of kHz with a modulation at least a factor ten lower, e.g. below 800 Hz. Without being bound by theory, it is noted that sound intensities which would be needed in order to induce haptic feedback in a linear sense (i.e. using sound frequencies below 800 Hz directly) would be so high that this could lead to deafness. Also, because the wavelength of the sound is large at these low frequencies (6.8 m (50 Hz)-0.4 m (800 Hz), it means a very large transducer (many wavelengths in size) would be needed to generate the sound with any efficiency. Also, to produce these frequencies with an array of transducers the focal spot size would at best be in the order of a wavelength: that means 0.4-6.8 m in lateral width. Thus there would be little selectivity of what part of the body is excited.

In some embodiments, a respective acoustic phase $\Phi w1$, $\Phi w2$ of the acoustic waves W1,W2 generated by a respective transducer 11,12 is determined by a driving phase $\Phi d1$, $\Phi d2$ of the alternating component "A" in the respective driving signal V1,V2; and a frequency difference between a driving frequency Fm in the respective driving signal V1,V2 relative to a respective resonance frequency Fr1,Fr2 of a respective transducer 11,12. This may cause (static) phase shifts $\Phi dw1$, $\Phi dw2$ between the acoustic waves W1,W2.

Without being bound by theory, a piezoelectric transducer (e.g. membrane) can be described by a transfer function detailing the frequency dependent conversion of voltage to pressure in an amplitude (the amplitude transfer function) and a phase (the phase transfer function). The resonance frequency is the frequency where the amplitude transfer function has a maximum. For a weakly damped transducer (such as a membrane optimized for haptic feedback), the phase transfer function typically experiences a 180 degree phase flip around the resonance frequency as one varies the excitation frequency. The latter phase behavior of the transducer (the piezoelectric phase) may contribute to static phase shifts $\Delta\Phi dw1$, $\Delta\Phi dw2$.

In other or further embodiments, a respective frequency of the acoustic waves W1,W2 generated by a respective transducer 11,12 is determined by the one or more driving frequencies Fc,Fm of the alternating component "A" in the respective driving signal V1,V2; and the resonance frequency Fr1,Fr2 of a respective transducer 11,12. For example, the alternating component "A" may comprise limited bandwidth with driving frequencies, wherein a dominant frequency in the resulting vibrations may differ, depending on the respective resonance frequencies Fr1,Fr2. This may cause time dependent phase shifts $\Delta\Phi dw1$, $\Delta\Phi dw2$ between the acoustic waves W1,W2.

In a preferred embodiment, the bias voltages B1,B2 are controlled to minimize a variation in respective phase shifts $\Delta\Phi dw1$, $\Delta\Phi dw2$ between a respective phase $\Phi d1$, $\Phi d2$ of the driving signals V1,V2 and a respective phase $\Phi w1$, $\Phi w2$ of the acoustic waves W1,W2. For example, this may be achieved by adjusting the bias voltage B1,B2 to make the resonance frequencies Fr1,Fr2 of different transducers 11,12 more uniform. Typically, this will result in an optimum setting wherein the bias voltage B1,B2 is different for different transducers 11,12. For example, the bias voltage B1 applied to one transducer 11 in the array may typically differ from the bias voltage B2 applied to another transducer 12 in the array by more than one millivolt, more than ten millivolt, more than hundred millivolt, more than one volt, more than ten volt, or even more than hundred volt. This depends of course on the variation of transducer characteristics such as the spread of intrinsic resonance frequencies. Also, the maximum/minimum allowable DC bias voltage can be limited in some embodiments by the breakthrough voltage through the piezomaterial, but also by the break through voltage of the materials separating the electrical lines (could be air). Furthermore, the maximum allowable DC Voltage could be limited by heating effects or power use. The bias voltage (applied over electrodes of a piezoelectric material) can be positive or negative, e.g. generating an electric field along the polarization of the piezoelectric material, or counter to this polarization.

To avoid damage or depolarization of the piezoelectric material, it may be preferred to use (absolute) bias voltages less than thousand Volt, less than five hundred Volt, less than hundred Volt, less than fifty Volt, less than ten Volt, less than five Volt, or even less than one Volt. This may depend on the geometry (thickness of piezomaterial), frequency and type of piezomaterial. For example, PZT5H piezomaterial has a relatively low breakthrough voltage while PVDF-TRFE has a relatively high breakthrough voltage. Alternatively, or additionally, it may be envisaged to exclusively use bias voltages generating an electric field in the same direction as used for polarizing the piezoelectric material to alleviate depolarization. Depending on the relative voltages, it may be noted that the added DC+AC should preferably stay below the breakthrough voltage.

In some embodiments, a variation of a respective resonance frequency Fr1 may be mapped as a function of the respective bias voltage B1 to the respective transducer 11. For example, the correspondence may be approximately linear at least over a range of bias voltages. For example, the change in resonance frequency per change of the bias voltage (Fr/B) may be approximated at a typical value somewhere between 0.01-1000 Hz/V, more typically between 0.05-500 Hz/V. This may depend e.g. on materials and dimensions of the transducers. The correspondence may also be different for different transducers within the array, although the correspondences will generally be approximately similar for similar types of transducer.

In some embodiments, the respective driving signal to each one or more of the transducers is calibrated with a respective bias voltage B1,B2. For example, the bias voltage is configured to tune a respective resonance frequency of the one or more transducers for lowering an overall spread of resonance frequencies Fr1,Fr2 frequencies of the plurality of transducers. In some embodiments, the calibration may be performed once, e.g. after manufacturing the device. This may already improve uniformity compared to an uncalibrated array. However, the characteristics may change is some embodiments after use, or depending on specific use, or circumstances. Accordingly, the calibration may be repeated between use, or even during use.

In a preferred embodiment, the bias voltages B1,B2 are iteratively varied to lower a spread in resonance frequencies Fr1,Fr2 between the transducers 11,12, e.g. until a minimum is achieved. In some embodiments, the minimum spread may be determined by finding an optimum in an efficiency of the generated waves. For example, a peak intensity of the waves can be measured and maximized by varying the bias voltages. Alternatively, or in addition, any time dependent variation of the intensity can be minimized.

In some embodiments, one or more of the resonance frequencies Fr1,Fr2 are directly or indirectly measured, e.g. as a function of a respective bias voltage B1,B2. In a preferred embodiment, a driving signal V1 with a first bias voltage B1 is applied to a first transducer 11 of the array of transducers 11,12, and a resulting first resonance frequency Fr1 of the first transducer 11 is measured using a second transducer 12 of the array of transducers 11,12. For example, in a measuring mode, the second transducer 12 does not receive a driving signal V2, or at least not the alternating component "A" of the driving signal (optionally a second bias voltage B2). For example, a signal resulting from its indirect actuation by the first transducer 11 (via the air or substrate between) is measured. Alternatively, or in addition, to the measurement of frequency, an amplitude of the resulting signal can be measured. For example, when the first bias voltage B1 is selected such that transducers 11,12 are closely matched in resonance frequency, an amplitude of the measured signal in the second transducer 12 may be relatively high.

In other or further embodiments, operational parameters of the transducers such as resonance frequency, can also be measured in other ways. For example, one or more separate detectors can be used. In one embodiment, the transducers 11,12 are disposed on or in a substrate 10 having a backplane. For example, a separate or integrated detector is configured to measure an amplitude of waves generated in the backplane. As will be appreciated, acoustic waves generated by the transducers may propagate in the backplane, wherein an amplitude of such waves may be maximal when the transducers vibrate at the same frequency, e.g. forming a standing wave in the backplane. As will be understood, the amplitude will be highest when the detector is located in an antinode of the standing wave pattern. In some embodiments, the expected standing wave frequencies are determined beforehand and the detectors are located accordingly (or multiple detectors can be used).

Figure 2A:
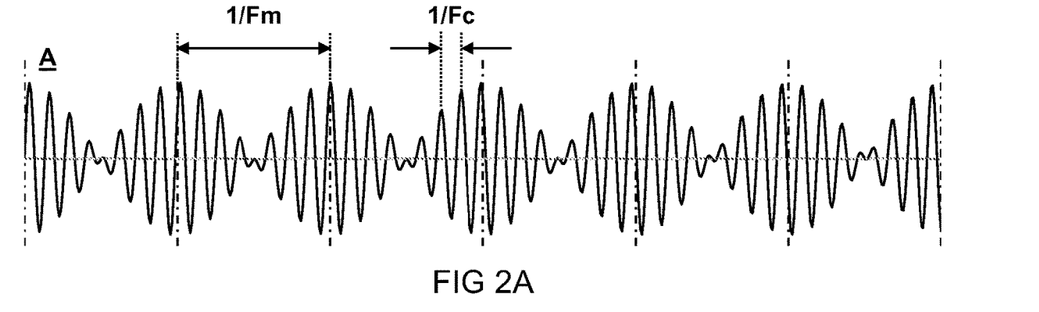
FIGS. 2A-2D illustrate an alternating component of driving signals and corresponding acoustic waves.
Figure 2B:
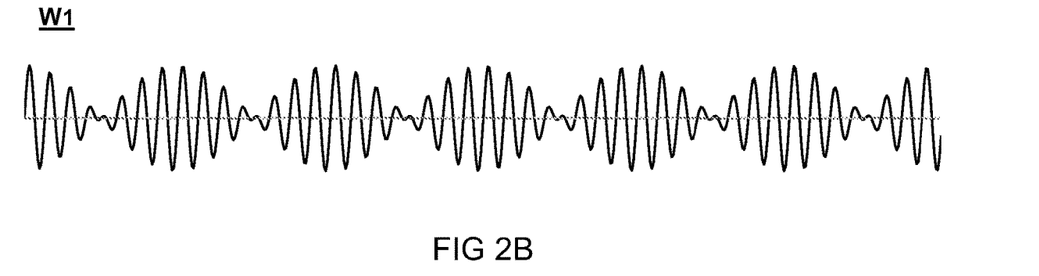
Figure 2C:
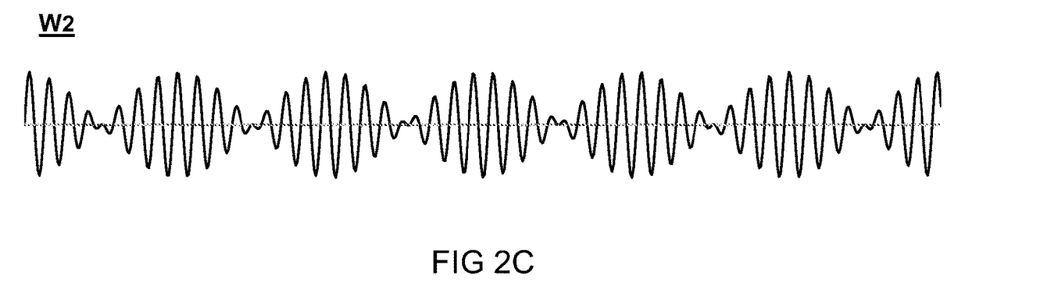
Figure 2D:
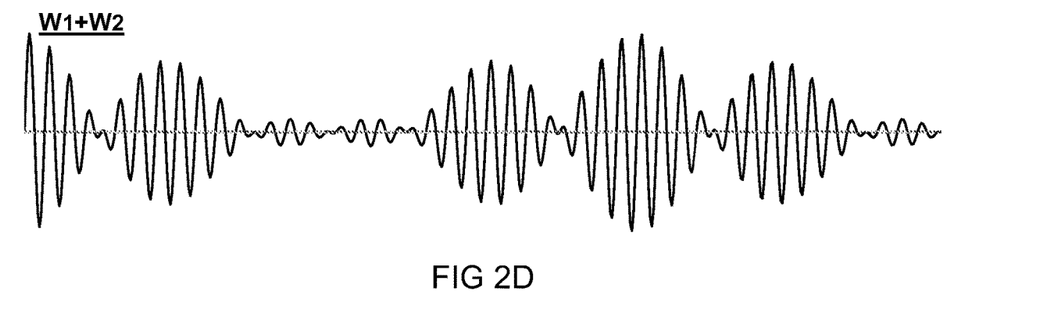

FIGS. 2A-2D illustrate an alternating component "A" of driving signals and corresponding acoustic waves W1,W2. FIG. 2A illustrates an alternating component "A" of a driving signal comprising two frequencies, including a carrier frequency Fc and modulation frequency Fm. FIG. 2B illustrates a first acoustic wave W1 generated as a result of the driving signal. FIG. 2C illustrates a second acoustic wave W2 generated as a result of the same driving signal. It may be difficult to see, but the acoustic waves W1,W2 have a slightly different carrier frequency, e.g. as a result of differences between the respective resonance frequencies of the transducers. FIG. 2D illustrates a combination of the acoustic waves W1+W2. This clearly illustrates the effect of destructive interference when the phases of the carrier frequencies in the waves get out of phase. Of course it will be understood that the present teachings can also be applied to driving signals having only one frequency, or more than two frequencies. For example, a driving signal having only the carrier frequency would produce similar periodic interference in transducers with different resonance frequencies.

Figure 3A:
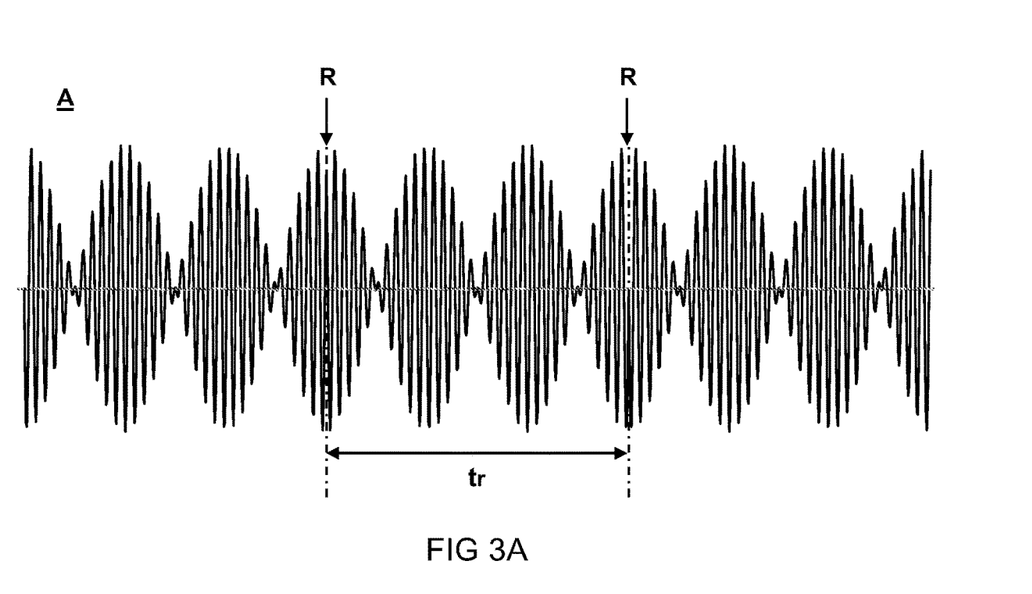
FIGS. 3A and 3B illustrates periodic resetting an alternating component of the driving signals.
Figure 3B:
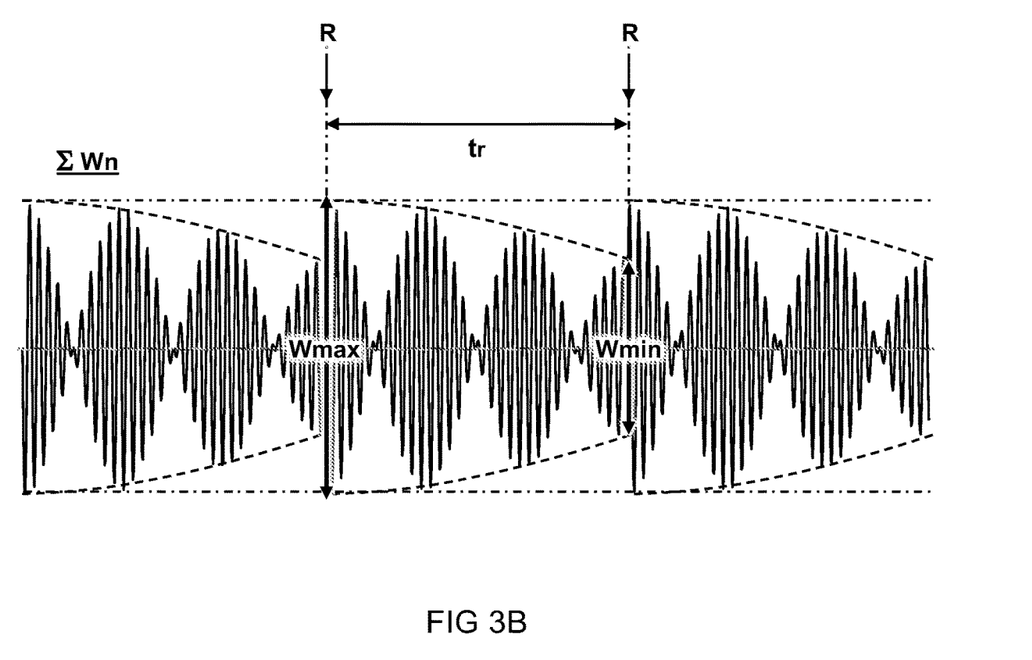

FIGS. 3A and 3B illustrates periodic resetting R an alternating component "A" of the driving signals. While the use of bias voltage B1,B2 as described herein can significantly alleviate undesired phase shifts, the correction may not always be perfect. For example, in embodiments where acoustic waves are maintained for long periods of time (or with high frequencies), any remaining error in the correction may accumulate. For example, the measurement of the resonance frequencies may not be perfect. For these, or other reasons it can be advantageous in some embodiments to apply a reset R to the alternating component "A". While resetting or synchronizing of transducers by flipping an alternating component of the driving signal, as described herein, can be synergistically used in addition to the correction of resonance frequencies by the use of bias voltages, it can also be envisaged for use without bias voltages.

In some embodiments, the alternating component "A" to at least a subset of the transducers 11,12 is periodically reset to realign phases of the resulting acoustic waves W1,W2. For example, the reset occurs after some reset period "tr", e.g. based on an expected error or remaining difference in resonance frequencies, and expected time needed until at least partial destructive interference occurs. In other or further embodiments, the alternating component "A" to at least a subset of the transducers 11,12 is reset when a measured effect of the combined acoustic waves drops below a predetermined threshold "Wmin". For example, the threshold "Wmin" is selected as a percentage or fraction of the maximum measured effect, e.g. relative air pressure at some point above the array, or relative amplitude of the backplane. For example, when the combined signal drops below a threshold fraction in a range between 0.5-0.9, the transducers are resynchronized.

In some embodiments, the reset comprises zeroing the alternating component "A" for a period of time and then restarting the actuation. However, this may cause some downtime in the transducers. In a preferred embodiment, actuation of at least a subset of multiple transducers 11,12 is reset by a synchronized flip of a polarity of the alternating component "A" to the subset. By flipping a polarity of the alternating component "A", e.g. when the component is maximum the phases of the respective transducers may be forced to reset and synchronize relatively quickly. Alternatively, or in addition to periodic resets, also other adaptations can be implemented, e.g. changing the bias voltages and/or driving frequencies to the transducers 11,12.

In one embodiment, the driving signals to a subset of the transducers are periodically changed based on local measurement of the subset, while driving signals to the remaining transducers remain unchanged. By each time updating the driving signals only to a respective subset of the transducers, the operation of the remaining transducers may be unaffected, e.g. avoiding interruption of total signal. For example, the updating may progress sequentially over all subsets of transducers.

In some embodiments (not shown), the reset can be described as a broadband excitation for a very short period of time. For example, this can be modeled as the end of a time windowed sinusoid with frequency and first phase and the start of a time windowed sinusoid with frequency and second phase. Accordingly, This means that the old wave will die out over a number of cycles (can be a few, can be tens, depends on the bandwidth) and the new wave will build up over a number of cycles.

Figure 4A:
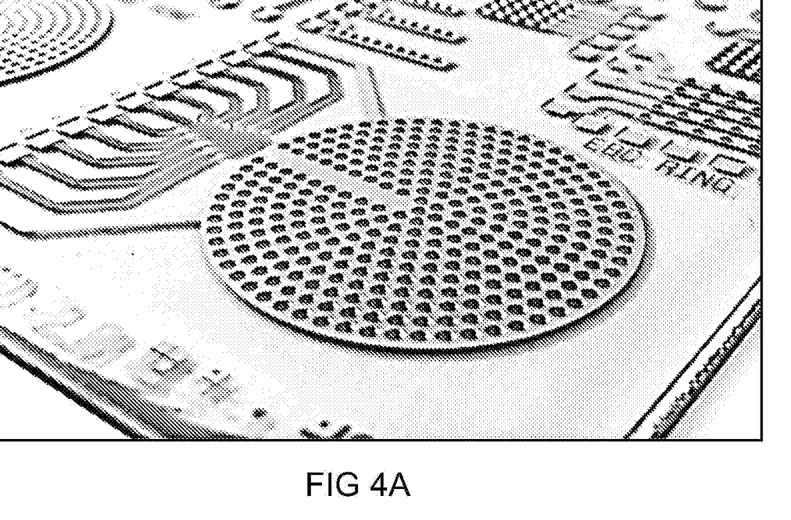
FIG. 4A shows an image of a transducer array.

FIG. 4A shows an image of a transducer array. In some embodiments, e.g. as shown, the transducer array may comprise a circular arrangement of transducers. In some embodiments, each one of the transducers may have a separate electric path or line for carrying the driving signals. In other or further embodiments, subsets of transducers may share a signal line for carrying driving signals. Variable bias voltages may be applied, e.g. between to the lines and the transducers, or directly on the lines.

Figure 4B:
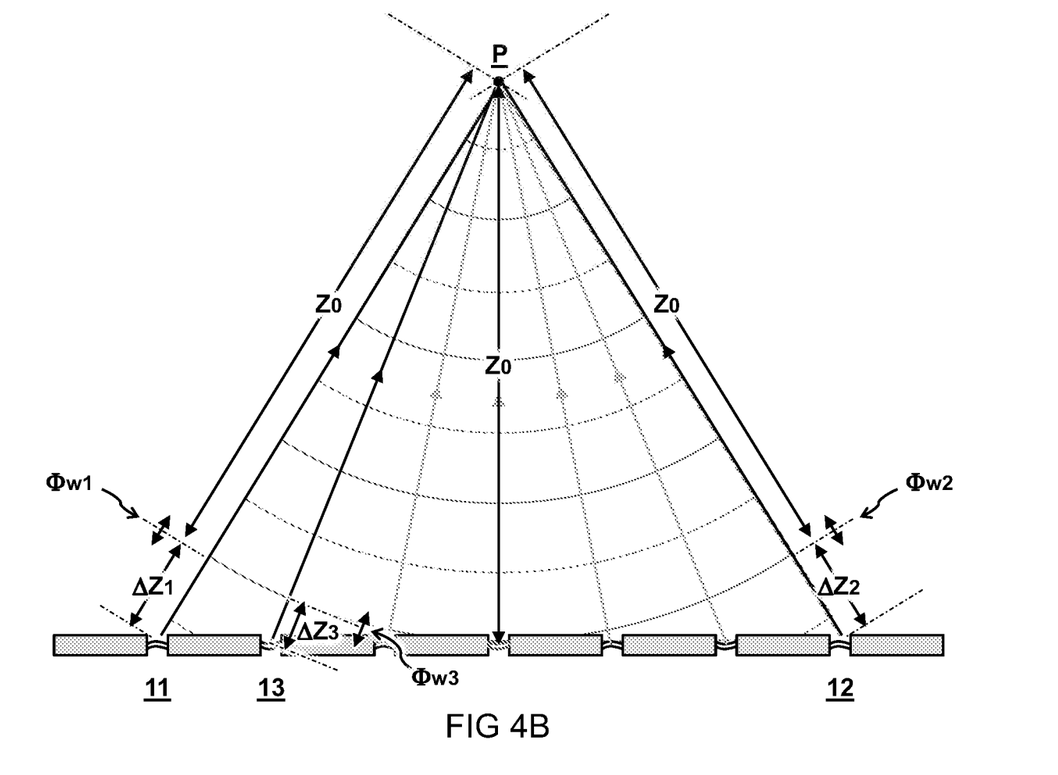
FIG. 4B illustrates distances from different transducers to a central point.

FIG. 4B illustrates distances from different transducers 11, 12, 13 to a central point P. For example, the figure may correspond to a cross-section view of an embodiment similar to the previous image. It may be noted that the distances $Z0+\Delta Zn$ (n=1, 2, 3) to a respective point "P" between different transducers 11, 12, 13 may be the same or different depending on the position of that point "P". To compensate for such differences in distance, some embodiments may provide a variable delay in the driving signals to align the respective phases $\Phi w1, \Phi w2, \Phi w3$.

Figure 5:
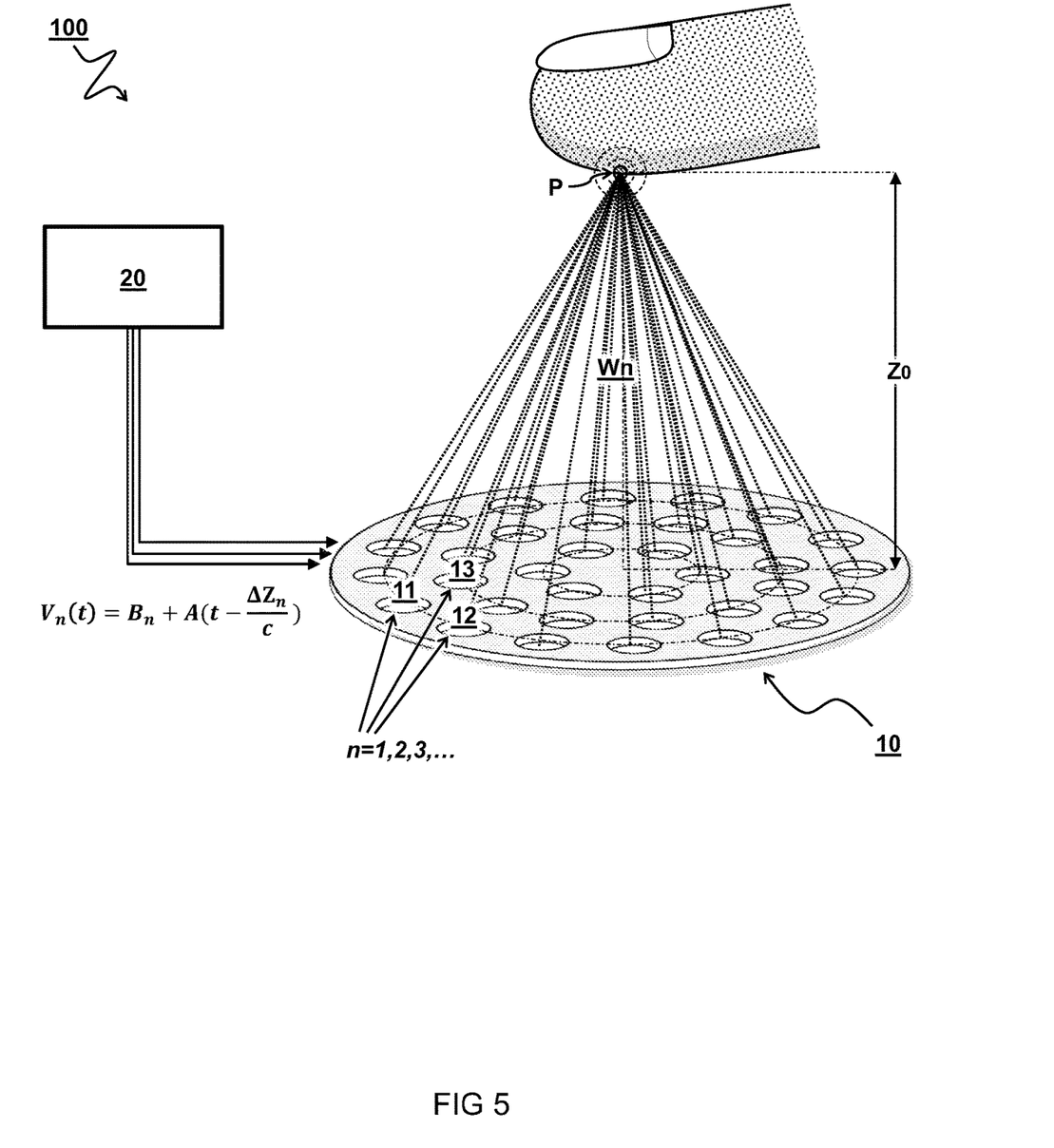
FIG. 5 illustrates a system with an array of transducers on a substrate, and corresponding controller.

FIG. 5 illustrates a system 100 with an array of transducers 11, 12, 13 on a substrate 10, and corresponding controller 20.

In some embodiments, a first driving signal V1 to a first transducer 11 exclusively differs from a second driving signal V2 to a second transducer 12 by the respective bias voltage B1,B2 (and optional time shift in the alternating component "A"). In other words, the alternating component "A" may be the same for at least some of the driving signals V1. For example, in the embodiment shown at least some of the transducers 11,12 may have the same distance to a point "P" where constructive interference between the acoustic waves is desired.

In other or further embodiments, a first driving signal V1 to a first transducer 11 has the same alternating component "A" as another driving signal to another transducer 13 in the array, but shifted in time t. For example, the alternating component of the driving signal to the third transducer 13 may be time shifted with respect to the alternating component to the first and/or second transducers 11,12. In some embodiments, e.g. as shown, the time shift depends on a relative distance of the respective transducers n=1, 2, 3 to a point P where constructive interference between the acoustic waves Wn is desired. Typically, the driving signals may be time shifted to compensate a phase lag due to the different distances $\Delta Zn$. The difference in travel times to the point P may e.g. be written as $\Delta Zn/c$ where "c" is the (phase) velocity of the acoustic waves. Of course the bias voltages Bn may also be different between transducers.

According to some aspects, the present teachings may be embodied as a system 100 comprising an array of piezoelectric transducers 11, 12, 13; and a controller 20 configured to apply respective driving signals Vn as described herein. In some embodiments, e.g. as shown, the system comprises a haptic (feedback) device, e.g. wherein the piezoelectric transducers 11,12 are disposed on a substrate 10 and controlled to generate respective acoustic waves Wn that constructively interfere at some point "P" at a distance Z0 from the substrate 10. In some embodiments, the point "P" may be shifted in position depending on relative phases of the acoustic waves.

For the purpose of clarity and a concise description, features are described herein as part of the same or separate embodiments, however, it will be appreciated that the scope of the invention may include embodiments having combinations of all or some of the features described. Some aspects of the present disclosure may comprise dynamically adjusting a bias or offset voltage to one element or a group of elements. Other or further aspects may relate to the synchronization of transducers, e.g. by flipping polarity. While embodiments were shown for specific configurations and applications, also alternative ways may be envisaged by those skilled in the art having the benefit of the present disclosure for achieving a similar function and result. E.g. arrays of transducers may be combined or split up into one or more alternative components. The various elements of the embodiments as discussed and shown offer certain advantages, such as optimizing performance and synchronization of piezoelectric based transducers. Of course, it is to be appreciated that any one of the above embodiments or processes may be combined with one or more other embodiments or processes to provide even further improvements in finding and matching designs and advantages. It is appreciated that this disclosure offers particular advantages to the generation of acoustic waves by constructive interference, and in general can be applied for any application wherein it is desired to further correct or calibrate different transducers.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method for controlling an array of piezoelectric transducers, the method comprising:
   applying driving signals to respective piezoelectric transducers, wherein the driving signals comprise an alternating component oscillating at one or more driving frequencies to cause corresponding vibrations in the respective piezoelectric transducers for generating acoustic waves;
   wherein one or more of the driving signals are offset by a respective bias voltage,
   wherein the bias voltage is controlled to reduce a difference in resonance frequencies between the piezoelectric transducers, and
   wherein the alternating component to at least a subset of the piezoelectric transducers is periodically reset to synchronize phases of the acoustic waves.

2. The method according to claim 1, wherein a driving signal with a first bias voltage is applied to a first transducer of the array of piezoelectric transducers, and a resulting first resonance frequency of the first transducer is measured using a second transducer of the array of piezoelectric transducers.

3. The method according to claim 1, wherein the piezoelectric transducers are disposed on or in a substrate having a backplane, and wherein a detector is configured to measure an amplitude of acoustic waves generated in the backplane.

4. The method according to claim 1, wherein the alternating component to at least a subset of the piezoelectric transducers is reset when a measured effect of a combined acoustic waves drops below a predetermined threshold.

5. The method according to claim 4, wherein the measured effect of the combined acoustic waves is measured using one or more transducers in the array of piezoelectric transducers and/or by measuring an amplitude of waves generated in a backplane of a substrate onto which the array of piezoelectric transducers are disposed.

6. The method according to claim 1, wherein actuation of at least a transducer subset including multiple transducers of the array of piezoelectric transducers is reset by a synchronized flip of a polarity of the alternating component to the subset.

7. The method according to claim 1, wherein the driving signals, to a transducer subset including multiple transducers of the array of piezoelectric transducers, are periodically changed based on local measurement of the transducer subset, while driving signals to remaining transducers of the array of piezoelectric transducers remain unchanged.

8. The method according to claim 1, wherein a first driving signal to a first transducer exclusively differs from a second driving signal to a second transducer by the respective bias voltage.

9. The method according to claim 1, wherein a first driving signal to a first transducer has tea same alternating component as another driving signal to another transducer in the array of piezoelectric transducers, but shifted in time.

10. The method according to claim 1, wherein a respective acoustic phase of the acoustic waves generated by a respective transducer is determined by:
   a driving phase of the alternating component in the respective driving signal; and
   a frequency difference between a driving frequency in the respective driving signal relative to a respective resonance frequency of a respective transducer; and
   wherein a respective frequency of the acoustic waves generated by a respective transducer is determined by:
   the one or more driving frequencies of the alternating component in the respective driving signal, and
   the resonance frequency of a respective transducer.

11. The method according to claim 1, wherein the bias voltages are controlled to minimize a variation in respective phase shifts between a respective phase of the driving signals and a respective phase of the acoustic waves.

12. The method according to claim 1, wherein the bias voltages are different for different transducers of the array of piezoelectric transducers.

13. The method according to claim 1, wherein the bias voltages are iteratively varied to lower a spread in resonance frequencies between different transducers of the array of piezoelectric transducers.

14. A system comprising:
   an array of piezoelectric transducers; and
   a controller configured to apply respective driving signals to the to respective piezoelectric transducers, wherein the driving signals comprise an alternating component oscillating at one or more driving frequencies to cause corresponding vibrations in the respective piezoelectric transducers for generating acoustic waves;
   wherein one or more of the driving signals are offset by a respective bias voltage,
   wherein a magnitude of the bias voltage is controlled to reduce a difference in resonance frequencies between the piezoelectric transducers, and
   wherein the alternating component to at least a subset of the piezoelectric transducers is periodically reset to synchronize phases of the acoustic waves.

15. The system according to claim 14, wherein the system comprises a haptic device, and wherein the piezoelectric transducers are disposed on a substrate and controlled to generate respective acoustic waves that constructively interfere at a point at a distance from the substrate.

* * * * *